(No Model.) 3 Sheets—Sheet 1.

J. N. GREGG & C. C. STOUFFER.
MACHINE FOR MANUFACTURING WIRE GLASS.

No. 534,391. Patented Feb. 19, 1895.

WITNESSES:
F. A. Lehmann

INVENTORS.
Jas. N. Gregg
Chas. C. Stouffer
BY
ATTORNEY.

(No Model.) 3 Sheets—Sheet 2.
J. N. GREGG & C. C. STOUFFER.
MACHINE FOR MANUFACTURING WIRE GLASS.
No. 534,391. Patented Feb. 19, 1895.
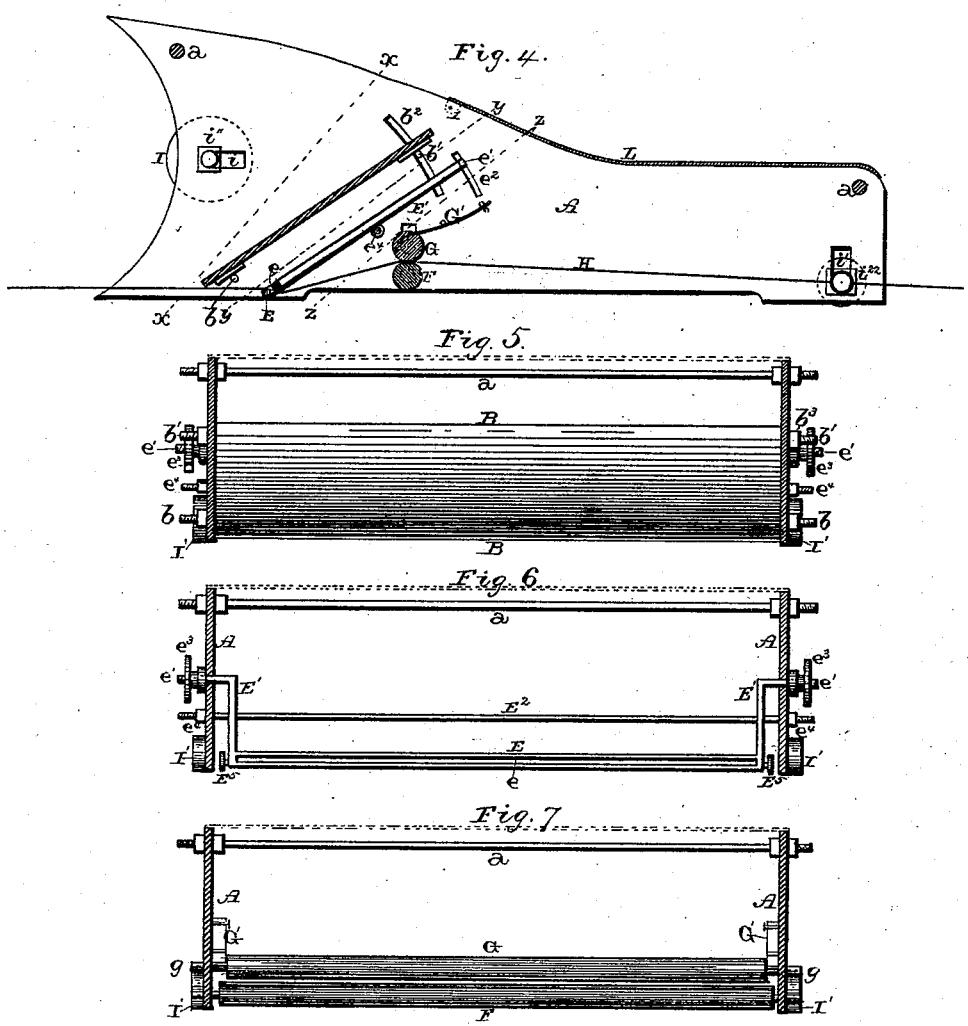

(No Model.) 3 Sheets—Sheet 3.
J. N. GREGG & C. C. STOUFFER.
MACHINE FOR MANUFACTURING WIRE GLASS.
No. 534,391. Patented Feb. 19, 1895.
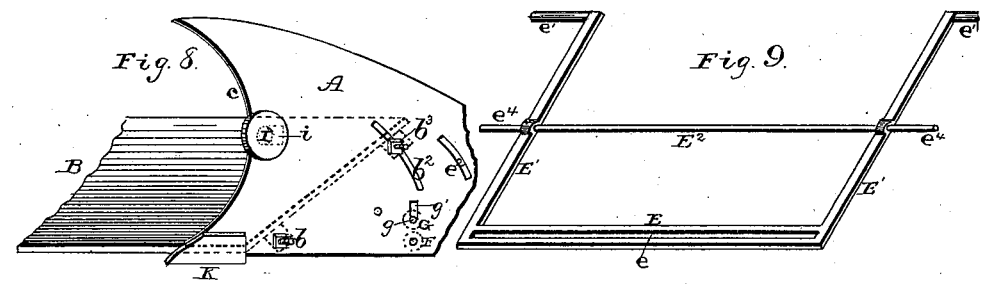
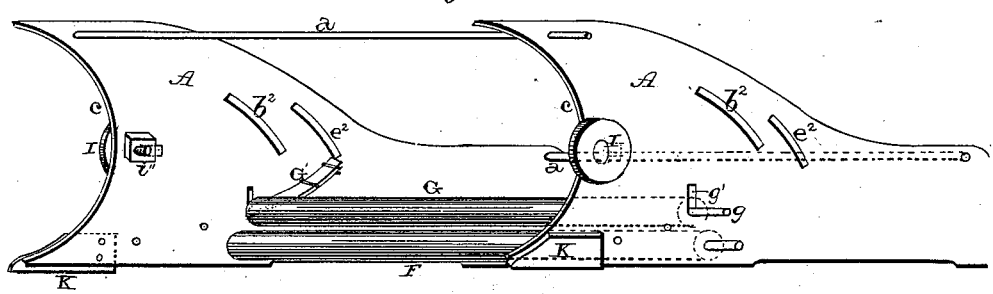
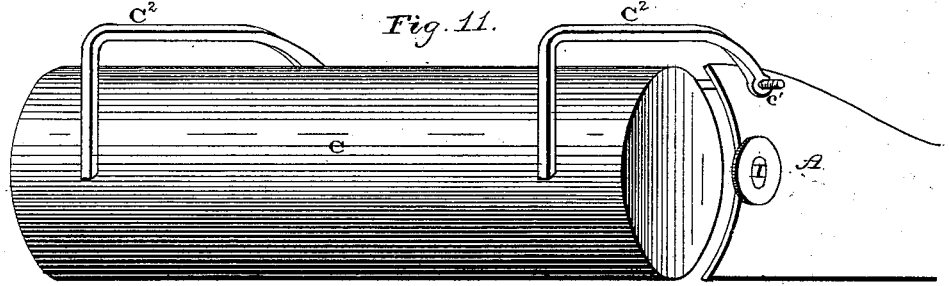
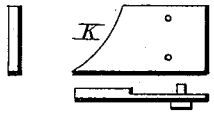
WITNESSES:
INVENTORS

UNITED STATES PATENT OFFICE.

JAMES N. GREGG AND CHARLES C. STOUFFER, OF NEW KENSINGTON, PENNSYLVANIA.

MACHINE FOR MANUFACTURING WIRE-GLASS.

SPECIFICATION forming part of Letters Patent No. 534,391, dated February 19, 1895.

Application filed July 7, 1894. Serial No. 516,876. (No model.)

*To all whom it may concern:*

Be it known that we, JAMES N. GREGG and CHARLES C. STOUFFER, citizens of the United States, residing at New Kensington, in the county of Westmoreland and State of Pennsylvania, have invented a new and useful Machine for the Manufacture of Wire-Glass, of which the following is a specification.

This invention relates to machines for the manufacture of wire glass, and it has for its object to provide a simple and improved machine of this class, which will possess advantages in point of general efficiency, accuracy, effectiveness, convenience, ease of operation, and adjustability.

Figure 1:
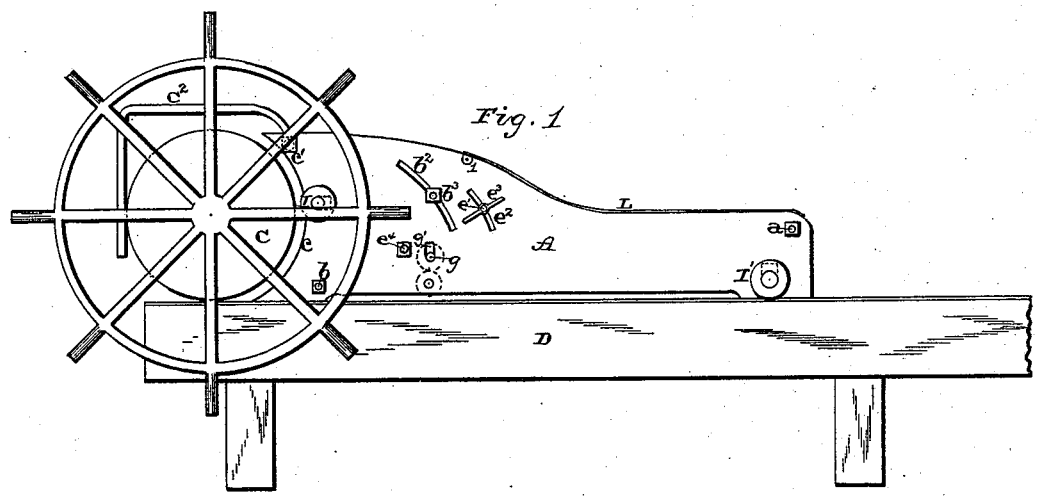
Figure 2:
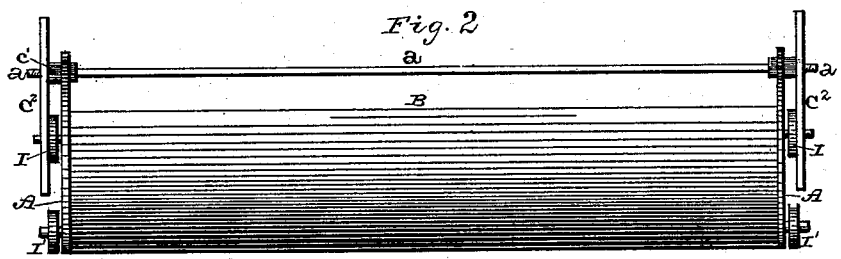
Figure 3:
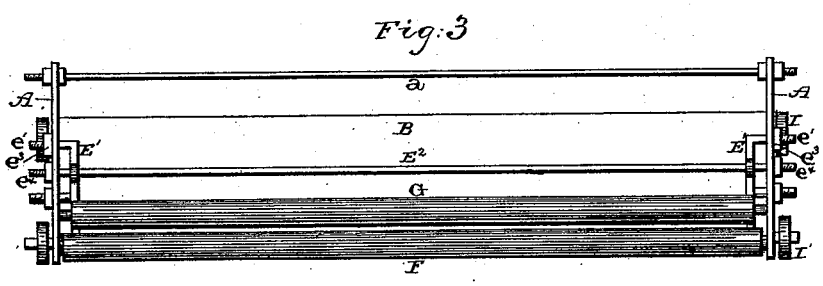

In the drawings—Figure 1 is a side elevation of a machine embodying our improvements. Fig. 2 is a rear end elevation. Fig. 3 is a front end elevation. Fig. 4 is a vertical longitudinal sectional view. Fig. 5 is a vertical transverse sectional view, taken on the line $x$—$x$, Fig. 4. Fig. 6 is a vertical transverse sectional view, taken on the line $y$—$y$, Fig. 4. Fig. 7 is a vertical transverse sectional view, taken on the line $z$—$z$, Fig. 4. Fig. 8 is a detail perspective view, showing the chute or plate. Fig. 9 is a detail perspective view, illustrating the gage mechanism. Fig. 10 is a detail perspective view, illustrating the wire feed rolls. Fig. 11 is a detail perspective view, illustrating the hooks which engage the main roll. Fig. 12 is a detail perspective view, illustrating the removable points.

Corresponding parts in all the figures are denoted by the same letters of reference.

Referring to the drawings, A A designate the sides of our improved machine, which are suitably secured or connected by transverse rods or bolts $a$. These side pieces are formed by plates of suitable contour, and the machine may be constructed in the main of iron, steel, brass, or other suitable material.

B designates an incline chute or slide plate, which is mounted between the side plates and extends to a point near the bottom of the main roll. The office of this chute or slide is to convey the molten glass, which is thrown or fed to it, down to the main roll and over the wire, when the glass passes through the wire to the table of the machine.

The main roll, C, is arranged at the rear end of the side plates A A, the rear edge of the latter being preferably curved to conform to the contour of the roll, as shown at $c\ c$. This main roll is provided with a smooth surface, and a supplementary roll of corresponding finish may be provided in rear of the main roll, if desired.

D designates the table or base plate of the machine, which is preferably formed of cast iron and is of suitable length. The table may be provided with a smooth or ribbed surface, as desired.

From the top of the side plates, at their rear ends, project hooks, $C^2\ C^2$, which extend over and engage the main roll C, as shown. These hooks are approximately right-angular in contour and have their rear ends, which are preferably downwardly curved, pivotally connected to the upper rear ends of the side plates A A, as shown at $c'$.

The chute or slide plate B is adapted to be adjusted upwardly or downwardly to vary its angle of inclination, according to the thickness of the glass to be manufactured, or may be secured in stationary position when required. To provide for this adjustment, the chute or slide plate is pivotally-mounted at its lower end by means of laterally-projecting gudgeons, $b\ b$, bearing in the side plates A A, and is provided near its top with similar laterally-projecting gudgeons, $b'\ b'$, projecting through segmental slots, $b^2\ b^2$, in the side plates, set nuts, $b^3$, being carried upon the threaded ends of said gudgeons.

It will be understood that the machine can be arranged to manufacture any desired width of glass by employing a chute or slide of relatively adapted width and rolls of adapted length, without altering the other general mechanism or characteristics.

E designates a gage, which is arranged in front of and under the chute B, between the side plates A A, and is preferably formed of solid iron or tubular pieces. The gage is constructed with a slot, $e$, extending across its lower end, and embodies upwardly-projecting side pieces or bars, $E'\ E'$. The gage is adjustable upwardly or downwardly to vary its angle of inclination. To provide for this adjustment, the side bars $E'\ E'$ are provided at their upper ends with laterally-projecting arms, $e'$ $e'$, passing through segmental slots, $e^2$ $e^2$, in the side plates of the machine and carrying set nuts, $e^3$. The gage is pivotally-mounted by means of a transverse bar, $E^2$, arranged at about the center and having its ends bearing in the side plate A A, as shown at $e^4$. The wire as it is run through the machine passes through the slot $e$ of the gage, and the office of the latter is to hold the wire in proper position and cause sufficient friction on the wire to retain it straight until it is caught by the glass and passes under the main roll. By adjusting the gage, the wire may be raised or lowered, in accordance with the desired thickness of the glass to be manufactured.

Small wheels or rollers, $E^5$ $E^5$, may be provided upon the side bars of the gage at their lower ends to relieve the weight upon the table and lighten the draft as the wire is passed through the machine, and these wheels may be vertically adjustable, if desired.

F and G designate, respectively, two guide rolls mounted one above the other and extending transversely between the side plates A A preferably at a point under the gage E. The top one of these rolls, G, is vertically adjustable, to permit of the insertion of the wire between these rolls. This adjustment of the top roll G is preferably effected by having its end gudgeons, $g$ $g$, bearing in slots, $g'$ $g'$, in the side plates of the machine and acted upon by springs, $G'$.

In practice, the wire, indicated at H, passes between the guide rolls F and G, through the gage, and under the chute to a point at the lower rear ends of the side plates A A. The wire is thus brought in the center of the sheet of glass as it passes under the main roll in the manufacture of the glass.

I I designate wheels or rollers which are provided at the segmental rear ends $c$ of the side plates A A and preferably have their bearing shaft mounted in a horizontal slot, $i$, and secured by a set nut, $i^{11}$, by which arrangement the rollers may be adjusted. The purpose of these wheels or rollers is to lighten the draft on the main roll C. Similar wheels or rollers, $I'$ $I'$, are provided at the bottom, at the front end of the side pieces A A, and are adjustably mounted in similar vertical slots, $i'$, and secured by set nuts, $i^{22}$. The purpose of the wheels or rollers $i'$ $i'$ is to lessen the draft on the table.

K designates detachable points, which are preferably formed of steel or iron, and are secured by bolts, $k$ $k$, so that they can be readily removed from the machine and changed, in making light or heavy glass.

L designates a cover, which is preferably formed of a sheet of iron or steel and extends over the top of the machine from a point in front of the chute or slide to the front end. This cover conforms to the contour of the machine and serves to prevent the cold glass or particles of glass from falling down on the wire and clogging the small rolls or other mechanism. The cover is hinged at its rear or upper end, as shown at $l$, so that it may be elevated to enable the insertion of the wire between the small rolls and in the gage.

The glass is gaged by strands of steel of adapted thickness, laid on the table D, in the usual manner.

The operation and advantages of our invention will be readily understood by those skilled in the art to which it appertains.

The machine is first set up to the large roll C on the table D and the hooks $C^2$ are thrown over the roll, the wire being adjusted in position. The molten glass is then thrown on to the chute and runs down through the wire to the table. The large roll is then drawn toward the machine and the end of the wire held on the other side of the roll by means of pinchers or in any other suitable manner until the roll catches the glass with the wire. Then there is a flow of molten glass as the roll passes over the glass and wire, the latter being retained in the center of the glass.

It will be understood that the roll rests on the strands laid on the table, so that the strands retain the roll a proper distance from the table according to the thickness of glass to be manufactured.

In operation, our improved machine is designed to effect economy, simplicity, and speed in the manufacture of wire glass, and is adapted to produce a stronger and better quality of glass for the reason that the glass can be drawn from the machine while it is still hot and placed in the annealing furnace, thus obviating breakage, &c.

The machine also serves to secure the wire in accurate and straight position, and by reason of the improved construction, arrangement and operation and the accurate fitting of the wire, the latter will hold the particles of glass in position in case of breakage or damage.

Having thus described our invention, we claim and desire to secure by Letters Patent—

1. An improved machine for the manufacture of wire glass, comprising the side pieces or frame work, the roll C, a table or base plate, an inclined adjustable chute or slide plate mounted within the frame work with relation to said roll, an adjustable gage arranged in relation to said chute and adapted to carry the wire, and the guide rolls arranged in front of said gage, substantially as set forth.

2. The herein described machine for the manufacture of wire glass, comprising the side pieces or frame work, the table or base plate extending from the same, the main roll C arranged at the rear end of the side pieces, the inclined adjustable chute or slide plate mounted between the side pieces and having its lower end adjustable with relation to the table and the bottom of the main roll, the adjustable gage mounted between the side pieces and arranged under or in front of the chute and having its lower end adapted to receive the wire and retain the same in proper relative position, and the two transverse guide rolls mounted under the gage, between which guide rolls the wire is adapted to pass, substantially as set forth.

3. In a machine for the manufacture of wire glass, the combination, with the table or base plate, and the main roll, of an adjustable gage mounted with relation to the main roll and having a transversely-slotted lower end adapted to receive and carry the wire, said lower end being vertically adjustable with relation to the table and roll, and traction wheels or rollers at the lower end of the gage, substantially as and for the purpose set forth.

4. A machine for the manufacture of wire glass, embodying the table and roll, a chute for conveying the molten glass under the roll, a gage device adapted to carry the wire and elevate or lower the same so that it is held in proper relative or adjusted position with relation to the table and roll, and guide mechanism for the wire, substantially as set forth.

5. A machine for the manufacture of wire glass, comprising a frame work having the segmental or curved rear edges, c, provided with friction rollers, and the main roll connected with said frame work and operating with relation to said segmental edges, substantially as set forth.

6. A machine for the manufacture of wire glass, comprising the frame work having friction rollers at its rear edges, pivoted hooks projecting from said rear end, and the main roll held in connection with the frame work by said hooks and operating between the hooks and said rear end of the frame, substantially as set forth.

7. An apparatus for the manufacture of wire glass, comprising the table or bed plate; a frame movable thereon and embodying an inclined chute, an inclined gage through which the wire is adapted to pass, feed rolls, and pivoted hooks projecting from the rear end; and a main roll loosely connected with said movable frame by the hooks; substantially as set forth.

8. In an apparatus for the manufacture of wire glass, a machine movable upon the table or bed plate, through which the wire is adapted to pass, and comprising a feed chute for feeding the molten glass and guide or gage devices arranged in front of said chute for carrying and adjusting the wire said movable machine being adapted to feed the glass during its movement, and a main roll connected with the rear end of said movable frame, substantially as set forth.

In testimony whereof we affix our signatures in presence of two witnesses.

JAMES N. GREGG.
CHARLES C. STOUFFER.

Witnesses:
I. J. FULLER,
GEORGE GREGG.